US009589017B2

United States Patent
Khanolkar et al.

(10) Patent No.: US 9,589,017 B2
(45) Date of Patent: Mar. 7, 2017

(54) DATABASE SYSTEM FOR EXECUTING PARAMETER-SENSITIVE QUERY

(71) Applicant: Microsoft Corporation, Redmond, WA (US)

(72) Inventors: Nimish S. Khanolkar, Bellevue, WA (US); Pawel Terlecki, Bellevue, WA (US); Cesar A. Galindo-Legaria, Redmond, WA (US); Yavor V. Angelov, Redmond, WA (US); Mostafa Elhemali, Seattle, WA (US); Pooja N. Darera, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/514,259

(22) Filed: Oct. 14, 2014

(65) Prior Publication Data
US 2015/0032723 A1    Jan. 29, 2015

Related U.S. Application Data

(63) Continuation of application No. 12/651,634, filed on Jan. 4, 2010, now Pat. No. 8,874,547.

(51) Int. Cl.
G06F 17/30      (2006.01)

(52) U.S. Cl.
CPC .. G06F 17/30463 (2013.01); G06F 17/30433 (2013.01)

(58) Field of Classification Search
None
See application file for complete search history.

(56) References Cited

U.S. PATENT DOCUMENTS

| | | |
|---|---|---|
| 6,311,181 B1 | 10/2001 | Lee et al. |
| 7,464,071 B2 | 12/2008 | Galindo-Legaria et al. |
| 2002/0126545 A1 | 9/2002 | Warren et al. |
| 2005/0228779 A1 | 10/2005 | Chaudhuri et al. |
| 2006/0218123 A1 | 9/2006 | Chowdhuri et al. |
| 2007/0061287 A1 | 3/2007 | Le et al. |
| 2008/0052266 A1 | 2/2008 | Goldstein et al. |
| 2008/0052282 A1 | 2/2008 | Muras |
| 2008/0215531 A1 | 9/2008 | Markl et al. |
| 2008/0222093 A1 | 9/2008 | Fan et al. |
| 2008/0313131 A1 | 12/2008 | Friedman et al. |

(Continued)

OTHER PUBLICATIONS

Malik, et al., "A Black-Box Approach to Query Cardinality Estimation", Jan. 7-10, 2007, 3rd Biennial Conference on Innovative Data Systems Research (CIDR), Retrieved at <<http://www.cidrdb.org/cidr2007/papers/cidr07p06.pdf>>, pp. 56-67.

(Continued)

*Primary Examiner* — Hung Q Pham
(74) *Attorney, Agent, or Firm* — Aneesh Mehta; Kate Drakos; Micky Minhas

(57) ABSTRACT

A query is received. The query comprises a plural number of efficiency expressions. A key is generated for the query indicating a first selectivity region in multi-dimensional selectivity space comprising an array of selectivity regions arranged according to a grid with a number of dimensions equal to the plural number. The generated key is used to look up a stored query plan among a plurality of stored query plans. A stored query plan is executed for the query that is associated with a stored key determined to match the generated key.

20 Claims, 9 Drawing Sheets

(56) References Cited

U.S. PATENT DOCUMENTS

2011/0029508 A1    2/2011  Al-Omari et al.

OTHER PUBLICATIONS

Tao, et al., "Selectivity Estimation for Predictive Spatio-Temporal Queries", Mar. 5-8, 2003, Proceedings of the 19th International Conference on Data Engineering (ICDE'03), Retrieved at <<http://ieeexplore.ieee.org/stamp/stamp.jsp? arnumber=01260810>>, pp. 417-428.

Lopez, Fernando Azpeitia., "SQL Server 200~8 Full-Text Search: Internals and Enhancements", Jul. 2008, Retrieved at <<http://msdn.microsoft.com/en-us/library/cc721269.aspx>>, Microsoft Corporation, pp. 33.

DATABASE SYSTEM FOR EXECUTING PARAMETER-SENSITIVE QUERY

CROSS-REFERENCE TO RELATED APPLICATIONS

This application is a continuation application of U.S. patent application Ser. No. 12/651,634, titled "Parameter Sensitive Plans," filed on Jan. 4, 2010, now allowed, which is incorporated by reference herein in its entirety.

BACKGROUND

A database functions as an organized collection of information. Electronic data may be stored in a database to facilitate rapid data retrieval. Data is typically organized within a database in one or more tables, with the tables being arranged as an array of rows and columns. A table can include a set of records, with each record including a set of fields. Records are typically indexed as rows within a table, and the fields are typically indexed as columns, such that a row/column pair of indices can reference particular datum within a table. For example, a row can store a complete data record relating to a sales transaction, a person, a project, etc. Likewise, columns of the table can define discrete portions of the rows that have the same general data format such that the columns define fields of the records. Database applications enable users to compare, sort, order, merge, separate, and interconnect data stored in databases.

A query may be issued to a database to access data stored therein. Queries in database systems are typically posed in high level, declarative (non-procedural) languages that are translated into a procedural execution plan. Numerous query languages exist, including SQL (Structured Query Language) and others. Many relational database management systems (RDBMSs) use query optimizers to select a query plan for a received query. The purpose of query optimization is to determine one or more ways in which the query can be translated into procedural plans, and to select the most efficient plan among the determined plans. The selected query execution plan typically includes a series of primitive database operators, and is typically selected according to a least estimated execution cost.

In RDBMSs, users issue queries against data that is stored in software constructs. When a query is received from a user, the RDBMS compiles the query by generating a query plan that can be executed against the database. As described above, for any such query, there are a variety of different query plans that can be appropriately used. For parameterized queries, different query plans may be more efficient depending on the particular values used for the parameters of the parameterized query. Some query plans will execute the query with a low cost, while other query plans will execute the query with a high cost. In order to avoid subsequent compilations of the same query, a query plan may be stored in memory so that the query plan can be quickly brought back for execution.

A particular query plan may be generated based on factors other than just the query text, such as available memory. Although each query plan may be valid across all values of those factors, plan reuse does not guarantee that an executed plan is currently optimal. Parameter values may impact the choice of access paths and the size of intermediate results, leading to different optimal query plans. One query plan generation strategy is to compile a query plan assuming parameter values submitted at the first execution. In this manner, an optimal query plan is used at the first execution. The compiled query plan may not be optimal for subsequent queries, however. Unfortunately, the use of suboptimal query plans may be prohibitive when queries process dramatically different numbers of rows due to different parameter values.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products are described herein for processing parameterized queries. A received query is compared with stored query plans to determine whether any of the stored query plans are suitable for being executed on the received query. The comparison is made based on selectivities of relational subexpressions of the received query involving the parameter values included in the received query. A selectivity space is partitioned in a grid fashion, and each query plan is associated with one or more selectivity regions/cells of the grid. If the selectivities of the subexpressions evaluated for the received parameter values fall in a particular selectivity region having an associated query plan, the query plan associated with that selectivity region is used to execute the received query. If the selectivities fall in a selectivity region that does not have an associated query plan, a new query plan is generated based on the received parameter values. The new query plan is associated with the selectivity region of the received query, and the new query plan is used to execute the received query.

For instance, in one implementation, a method for processing queries is provided. A first query is received that is configured according to a query template. The first query includes values for a plurality of parameters. A dispatcher is generated for the query template if a dispatcher is determined to not be present. A selectivity space is defined as an array of selectivity regions arranged according to a logarithmic-scale grid that has a number of dimensions equal to a number of subexpressions of the first query that involve parameters (e.g., also referred to as "efficiency expressions," "predicates," or "parameter-sensitive predicates"). A first selectivity region in the selectivity space is determined for the first query using the dispatcher. A first key is generated for the first query that includes an indication of the first selectivity region. The first key is associated with the first selectivity region. The first query is compiled to generate a first query plan. The first query plan is stored in association with the first key. The first query plan is executed with respect to the first query.

A subsequent query may be received that is configured according to the query template. The subsequent query may be the next query received after the first query, or any other later received query. The subsequent query includes values for the plurality of parameters. Based on the supplied parameter values, an appropriate selectivity region in the selectivity space is determined for the subsequent query. A key is generated for the subsequent query that includes the determined selectivity region. Whether the generated key matches any stored key, including the first key, is determined. A stored query plan is executed with respect to the subsequent query if the generated key is determined to match the key of the stored query plan. If the generated key is determined to not match any stored key, the subsequent query is compiled to generate a corresponding query plan, and the generated query plan is executed with respect to the subsequent query.

Furthermore, if the subsequent key was determined to not match any stored key, the generated query plan may be stored in association with the subsequent key. In one implementation, the dispatcher may store a mapping between keys and selectivity regions, so that a key does not necessarily include an indication of a single selectivity region but may be associated with one or more selectivity regions. The generated query plan may be stored in association with a new key if the query plan is determined to not match any stored query plan. Also, the mapping may be updated to associate the selectivity region with the key for the query plan. The mapping may be updated to associate the selectivity region with a stored key if the obtained query plan is determined to match the respective stored query plan.

In another implementation, a query processing system is provided. The query processing system includes a query interface, a dispatcher generator, and a cache. The query interface is configured to receive queries that include values for a plurality of parameters configured according to a query template. The dispatcher generator is configured to generate a dispatcher if a dispatcher is determined to not be present for the query template. The dispatcher includes a query compiler caller, a key generator, and a selectivity region mapper. The cache stores the dispatcher. The selectivity region mapper is configured to map the first query to a first selectivity region in a selectivity space. The selectivity space has a number of dimensions equal to a number of efficiency expressions of the first query, and includes an array of selectivity regions arranged according to a regular grid. The key generator is configured to generate a first key for the first query that includes an indication of the first selectivity region. The query compiler caller is configured to request the first query to be compiled to generate a first query plan. The first query plan is stored in the cache in association with the first key. The first query plan is executed with respect to the first query.

Furthermore, the dispatcher may include a query plan selector. The query plan selector is configured to lookup query plans stored in the cache for received queries. The query interface receives a second query configured according to the query template. The selectivity region mapper is configured to map the second query to a second selectivity region in the selectivity space. The key generator is configured to generate a second key for the second query that includes an indication of the second selectivity region. The query plan selector is configured to determine whether the second key matches any key stored in the cache. If the second key is determined to match a key stored in the cache, the query plan selector selects the query plan corresponding to a matched key for execution with respect to the second query.

If the query plan selector determines that the second key does not match any key stored in the cache, the query compiler caller is configured to request the second query to be compiled to generate a second query plan, and the second query plan is executed with respect to the second query. The second query plan may be stored in the cache in association with the second key.

In another implementation, a query comprises a plural number of efficiency expressions. A key is generated for the query indicating a first selectivity region in multi-dimensional selectivity space comprising an array of selectivity regions arranged according to a grid with a number of dimensions equal to the plural number. The generated key is used to look up a stored query plan among a plurality of stored query plans. A stored query plan is executed for the query that is associated with a stored key determined to match the generated key.

Computer program products are also described herein that enable the processing of received queries, that enable the generating and managing of selectivity regions and query plans, and that enable further embodiments as described herein.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant arts) based on the teachings contained herein.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
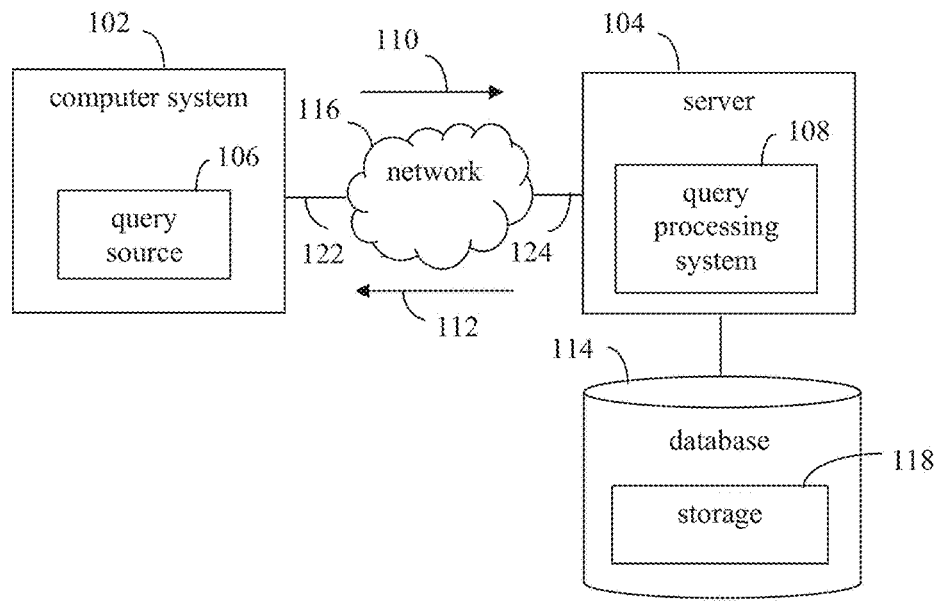
FIG. 1 shows a block diagram of a data communication system, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an

DETAILED DESCRIPTION

I. Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

II. Example Embodiments

Embodiments of the present invention relate to the processing of queries issued to databases to obtain data. For example, FIG. 1 shows a block diagram of a data communication system 100, according to an example embodiment. As shown in FIG. 1, system 100 includes a computer system 102, a server 104, a network 116, and a database 114. Database 114 is coupled to server 104. Computer system 102 and server 104 are communicatively coupled by network 116.

Computer system 102 be any type of computing device, including a desktop computer (e.g., a personal computer), a server, a mobile computer or computing device (e.g., a Palm® device, a RIM Blackberry® device, a personal digital assistant (PDA), a laptop computer, a notebook computer, etc.), or other type of computer system. Server 104 may be any type of computing device described herein or otherwise known that is configured to process database queries.

As shown in FIG. 1, database 114 may include storage 118 configured to store data. For example, data of database 114 may be stored in storage 118 in the form of one or more tables, with the tables being arranged as an array of rows and columns. For instance, a table can include a set of records, with each record including a set of fields. The records may be indexed as rows within a table, and the fields may be indexed as columns, such that a row/column pair of indices can reference particular datum within a table. Data of database 114 may alternatively be stored in storage 118 in other ways, in embodiments. Storage 118 may include one or more of any type of storage mechanism to store content (e.g., objects), including a hard disk drive, an optical disc drive, a memory device such as a RAM device, a ROM device, etc., and/or any other suitable type of storage medium. Storage 118 may include long term storage (e.g., a hard disk drive) or temporary storage (e.g., a RAM device).

Network 116 may include one or more communication links and/or communication networks, such as a PAN (personal area network), a LAN (local area network), a WAN (wide area network), or a combination of networks, such as the Internet. First and second communication links 122 and 124, which respectively couple first computer system 102 and server 104 to network 116, may include any number of communication links, including wired and/or wireless links, such as IEEE 802.11 wireless LAN (WLAN) wireless links, Worldwide Interoperability for Microwave Access (WiMAX) links, cellular network links, wireless personal area network (PAN) links (e.g., Bluetooth™ links), Ethernet links, USB links, etc.

System 100 is configured to enable computer systems such as computer system 102 to issue queries to database 114. For example, as shown in FIG. 1, computer system 102 includes a query source 106. Query source 106 may be an application or other entity that is configured to issue queries. Furthermore, as shown in FIG. 1, server 104 includes a query processing system 108. Query processing system 108 is configured to receive and issue queries against database 114.

For instance, query source 106 may generate a query 110. Query 110 may be a parameterized query having values provided for a plurality of parameters, for example. Query 110 may be formatted according to any query language, including SQL. Query 110 is transmitted from computer system 102 in a first communication signal through first communication link 122, network 116, and second communication link 124, to server 104. The first communication signal may be transmitted in any form. Server 104 receives query 110 in the first communication signal.

Query processing system 108 processes query 110. Query processing system 108 processes query 110 to generate a query plan, issues the query plan for query 110 against database 114 to generate response data, and includes the response data in a query response 112. In an embodiment, query response 112 may include one or more records and/or other data of database 114. Server 104 generates a second communication signal that includes query response 112. The second communication signal is transmitted through second communication link 124, network 116, and first communication link 122, and is received by computer system 102. The second communication signal may be transmitted in any form. Query source 106 at computer system 102 receives query response 112, and may utilize the response data of query response 112 in any manner.

Figure 2:
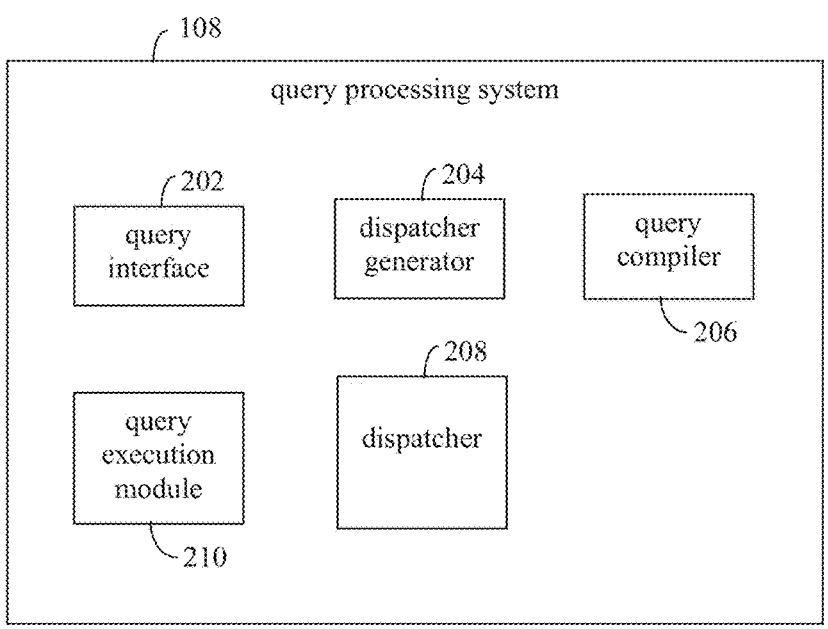
FIG. 2 shows a block diagram of a query processing system, according to an example embodiment.

Query processing system 108 may be configured in various ways to process query 110. For example, FIG. 2 shows a block diagram of query processing system 108, according to an example embodiment. As shown in FIG. 2, query processing system 108 includes a query interface 202, a dispatcher generator 204, a query compiler 206, a dispatcher 208, and a query execution module 210. These elements of query processing system 108 are described as follows.

Query interface 202 is optionally present. When present, query interface 202 may be configured to receive queries such as query 110 of FIG. 1, and may be configured to extract query predicates from each query.

Dispatcher generator 204 is optionally present. When present, dispatcher generator 204 is configured to generate dispatcher 208, which is used to generate and manage query plans (which may also be referred to as "execution plans," etc.) for queries of a corresponding query template. A query plan is a tree of operations (query operators) that a query engine performs to execute a query on a database. Such operations are well known to persons skilled in the relevant art(s). Examples of query operators include "Join," "GroupBy," "OrderBy," etc. In an embodiment, the first time during a runtime that a query is received according to a particular query template, dispatcher 208 may not be present. Dispatcher generator 204 may determine that dispatcher 208 is not present for the query template, and therefore may generate dispatcher 208 for that particular query template. In an embodiment, dispatcher generator 204 may compile the first received query to generate dispatcher 208.

Dispatcher 208 is configured to manage query plans for queries received according to its associated query template. For example, dispatcher 208 may be configured to look up a query plan for a received query, to request that a query plan be generated for a query if a suitable query plan for the query is not present, and to provide the looked-up or generated query plan for execution on the query. Dispatcher 208 stores query plans as separate entries (e.g., in a cache, as described below), and assigns keys to the stored query plans. In this manner, the query plans can be separately considered by eviction policy or execution statistics collection. Furthermore, as described in further detail below, dispatcher 208 may associate one or more selectivity regions in a selectivity space to each query plan. As such, dispatcher 208 may be referred to as a "selectivity region mapper." The use of selectivity regions enables dispatcher 208 to manage query plans in an efficient manner, enabling a balance to be maintained between managing a small number of more general query plans versus managing a larger number of more specific query plans.

Query compiler 206 is configured to compile query plans for received queries. For instance, query compiler 206 may be configured to compile query plans for queries at the request of dispatcher 208. Query compiler 206 may be configured to compile queries in any manner, including using conventional techniques, as would be known to persons skilled in the relevant art(s).

Query execution module 210 is configured to execute query plans selected by dispatcher 208 on received queries. For example, query execution module 210 may interact with database 114 of FIG. 1 to retrieve data for query response 112 by executing the selected query plan on query 110. Query execution module 210 may be configured to execute queries based on query plans in any manner, including using conventional techniques, as would be known to persons skilled in the relevant art(s).

Example embodiments are described in the following subsections for processing received queries, generating keys, determining selectivity regions, and managing query plans.

A. Example Embodiments for Processing a Received Query

Figure 3:
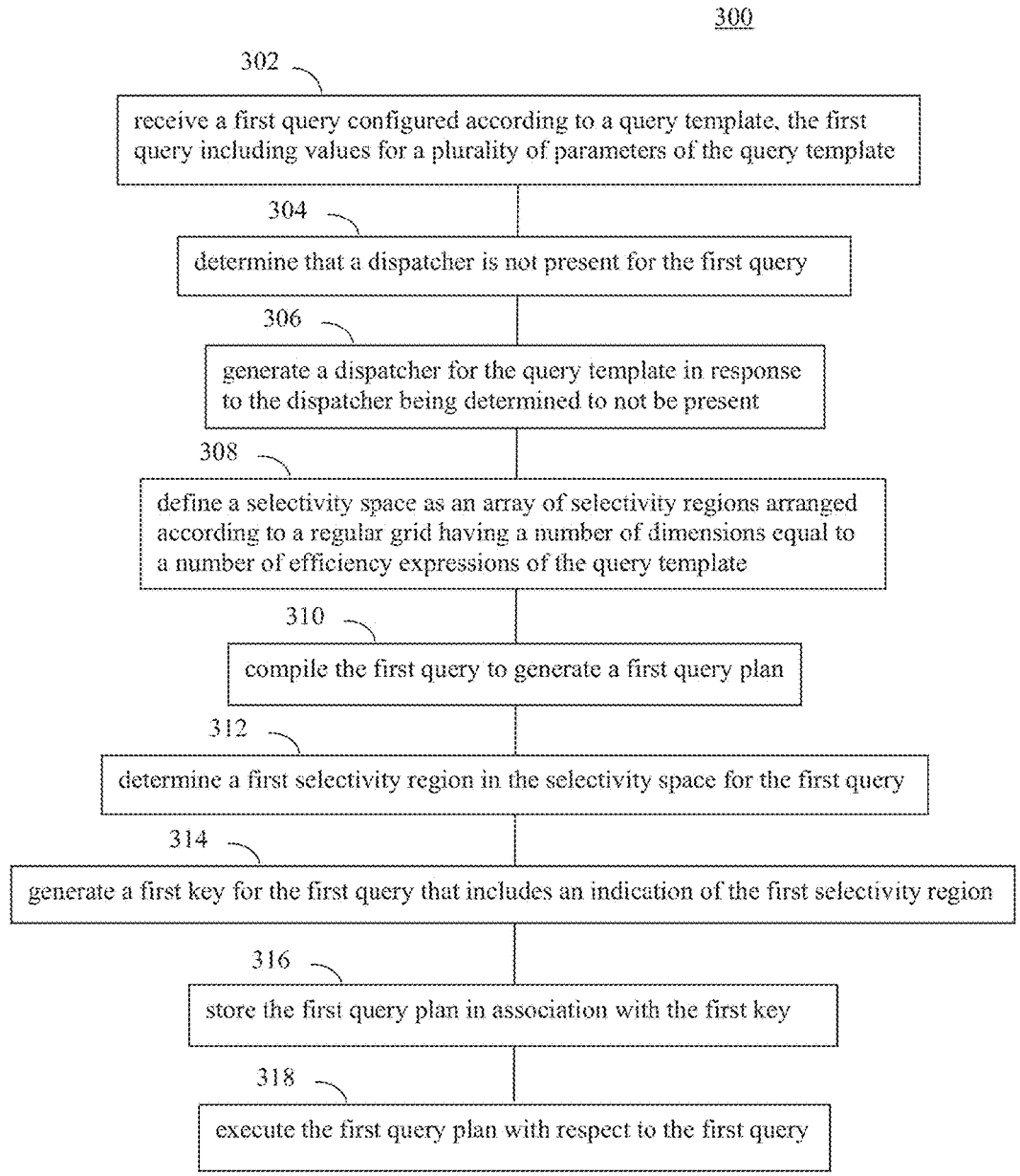
FIG. 3 shows a flowchart for processing queries, according to an example embodiment.

Embodiments for processing queries may be performed in various ways. For instance, FIG. 3 shows a flowchart 300 for processing queries, according to an example embodiment. In an embodiment, query processing system 108 may operate according to flowchart 300. Further structural and operational embodiments will be apparent to persons skilled in the relevant art(s) based on the discussion regarding flowchart 300. Flowchart 300 is described as follows. For illustrative purposes, flowchart 300 is described with respect to FIG. 4, which shows query processing system 108 of FIG. 2 processing a received query, according to an example embodiment.

Figure 4:
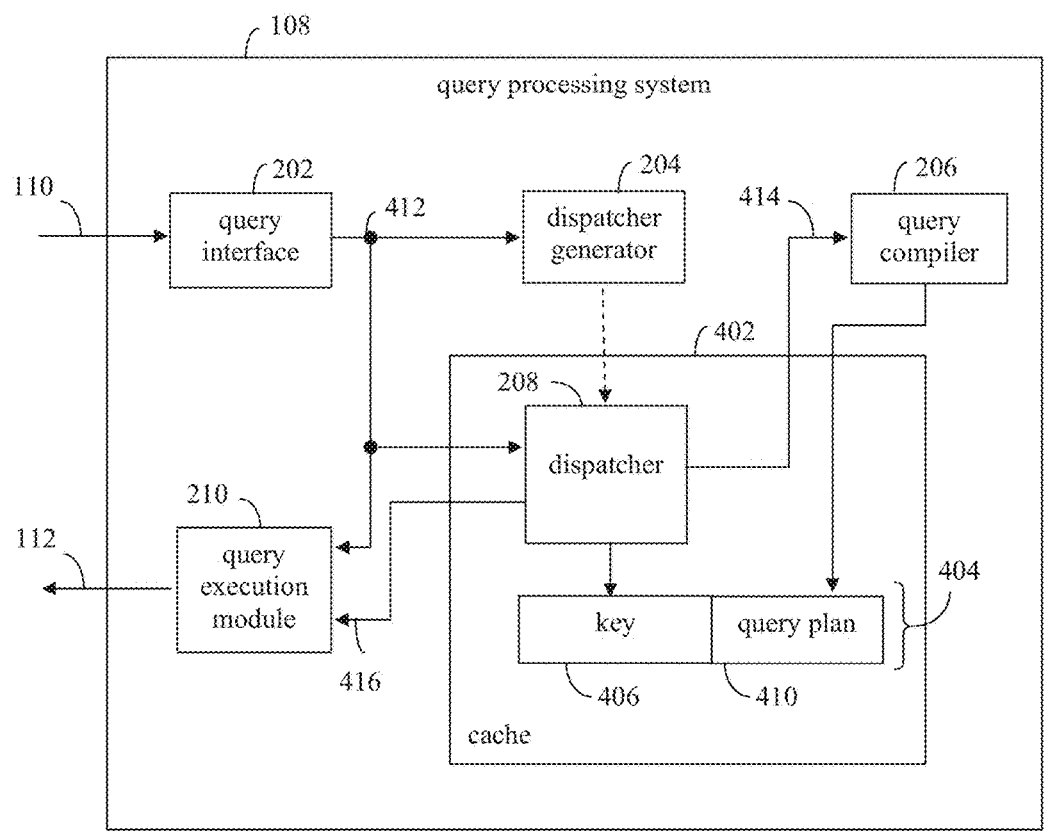
FIG. 4 shows the query processing system of FIG. 2 processing an example received query, according to an embodiment.

In step 302, a first query configured according to a query template is received, the first query including values for a plurality of parameters of the query template. For example, as shown in FIG. 4, query interface 202 receives query 110. When present, query interface 202 may be configured to identify query predicates in query 110 (e.g., to facilitate generation of query compilation plans), and may output received query 412 (which may include the identified query predicates, etc.). In general, efficiency expressions are parameterized subexpressions of query predicates referencing columns from a single table. Techniques for identifying efficiency expressions of a query are known to persons skilled in the relevant art(s).

Figure 5:
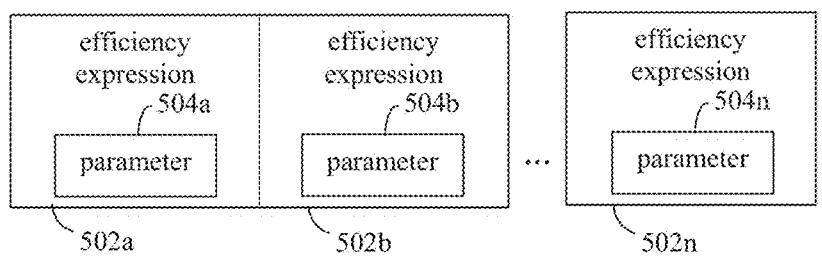
FIG. 5 shows a block diagram of a query template, according to an example embodiment.

Query 110 may be a query that is configured according to a particular query template. For instance, FIG. 5 shows a block diagram of a query template 500, according to an example embodiment. As shown in FIG. 5, query template 500 includes a plurality of efficiency expressions 502a-502n. Efficiency expressions 502 are parameterized subexpressions of query predicates referencing columns from a single table. Any number of efficiency expressions 502 may be included in query template 500. Each efficiency expression 502 may be an expression (e.g., a Boolean expression). An efficiency expression 502 is "parameter-sensitive" if the subexpression depends on a supplied parameter value. For example, as shown in FIG. 5, each of efficiency expressions 502a-502n includes a corresponding one of parameters 504a-504n. Parameters 504a-504n may be unspecified until runtime (e.g., may be indicated by symbols or placeholders in query template 500), when parameter values may be provided for each of parameters 504a-504n in an issued query. Query template 500 may be configured (e.g., by a user or developer) at development time for query source 106 of FIG. 1, for example. Query 110 includes values for each of efficiency expressions 502a-502n so that query 110 may be executed at runtime.

For illustrative purposes, a query template is shown below as an example of query template 500:

SELECT * FROM T WHERE (a=@p1) OR (b<@p2)

As shown above, the query template includes first and second efficiency expressions, (a=@p1) and (b<@p2). This query template is configured to select rows of a table T where a column "a" of the table T has an entry equal to "@p1" or where a column "b" of the table T has an entry that is less than "@p2", the values for the parameters "@p1" and "@p2" being filled in at runtime. For example, query 110 may include a parameter values of "5" for the parameter "@p1" and "32" for the parameter "@p2", such that query 110 is SELECT * FROM T WHERE (a=5) OR (b<32).

In step 304, a dispatcher is determined to not be present for the first query. For example, in an embodiment, dispatcher generator 204 receives received query 412, and determines whether a dispatcher is present for received query 412 and/or for the query template associated with received query 412. If a dispatcher is determined to not be present, step 306 may be performed. If dispatcher 208 is determined to be present, step 306 does not need to be performed.

In step 306, a dispatcher is generated for the query template in response to the dispatcher being determined to not be present. For example, in an embodiment, dispatcher generator 204 is configured to generate dispatcher 208 if dispatcher 208 is not present upon receiving received query 412. As shown in FIG. 4, dispatcher generator 204 generates dispatcher 208 after receiving received query 412. Dispatcher 208 is stored in cache 402 included in query processing system 108. Cache 402 may be included in one or more storage devices, such as one or more memory devices. Dispatcher generator 204 may generate dispatcher 208 in various ways. For example, dispatcher generator 204 may identify the efficiency expressions included in a received parameterized query, or may receive the identified efficiency expressions from query interface 202, as described above. For instance, with regard to the example query template shown above, the efficiency expressions of (a=5) and (b<32) may be identified, and stored in dispatcher 208.

Figure 6:
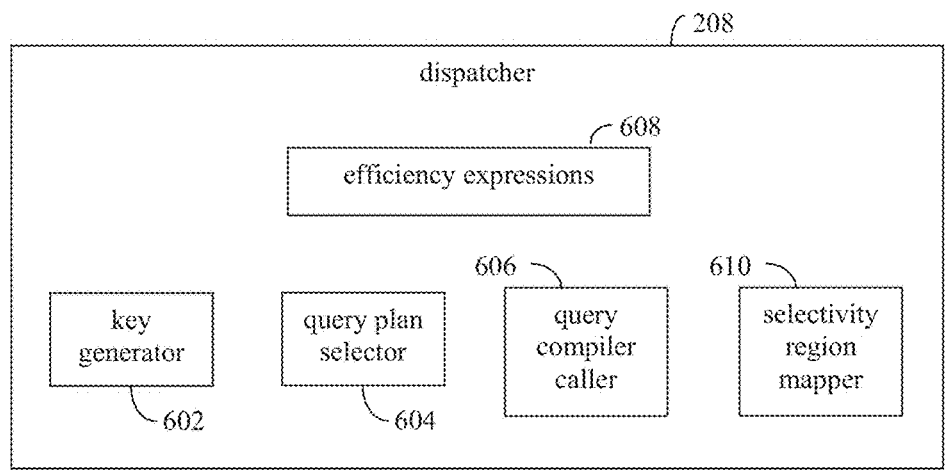
FIG. 6 shows a block diagram of a dispatcher, according to an example embodiment.

Dispatcher 208 stores compile time structures required for evaluating efficiency expressions. For example, dispatcher 208 may store statistics describing data distribution in tables referenced in the query template. FIG. 6 shows a block diagram of dispatcher 208, according to an example embodiment. As shown in FIG. 6, dispatcher 208 includes efficiency expressions 608. Efficiency expressions 608 include the identified efficiency expressions of received query 412. Furthermore, as shown in FIG. 6, dispatcher 208 includes a key generator 602, a query plan selector 604, a query compiler caller 606, and a selectivity region mapper 610. These elements of dispatcher 208 are described as follows.

Key generator 602 is configured to generate keys for query plans associated with dispatcher 208, as described in further detail below. For example, the generated keys may be used to identify and/or distinguish different query plans. Query plan selector 604 is configured to lookup stored query plans for received queries associated with dispatcher 208. For instance, query plan selector 604 may look up stored query plans using the keys generated by key generator 602. Query compiler caller 606 is configured to request compilation of a query to generate a query plan when a query plan is not present for the query, as determined by query plan selector 604. Selectivity region mapper 610 is configured to map queries to regions of a selectivity space, as described in further detail below.

Note that steps 304 and 306 are optional, and in other embodiments, dispatcher 208 may be already present (e.g., in storage) and/or may be generated prior to receiving queries.

In step 308, a selectivity space is defined as an array of selectivity regions arranged according to a grid having a number of dimensions equal to a number of efficiency expressions of the query template. In an embodiment, a selectivity space is defined that is used to manage query plans. The selectivity space is configured to have a number of dimensions equal to the number of efficiency expressions of the queries. The selectivity space is arranged according to a logarithmic-scale grid, with each region of the grid (selectivity region) corresponding to a percentage or fraction of rows of the table(s) targeted by the queries.

Figure 7:
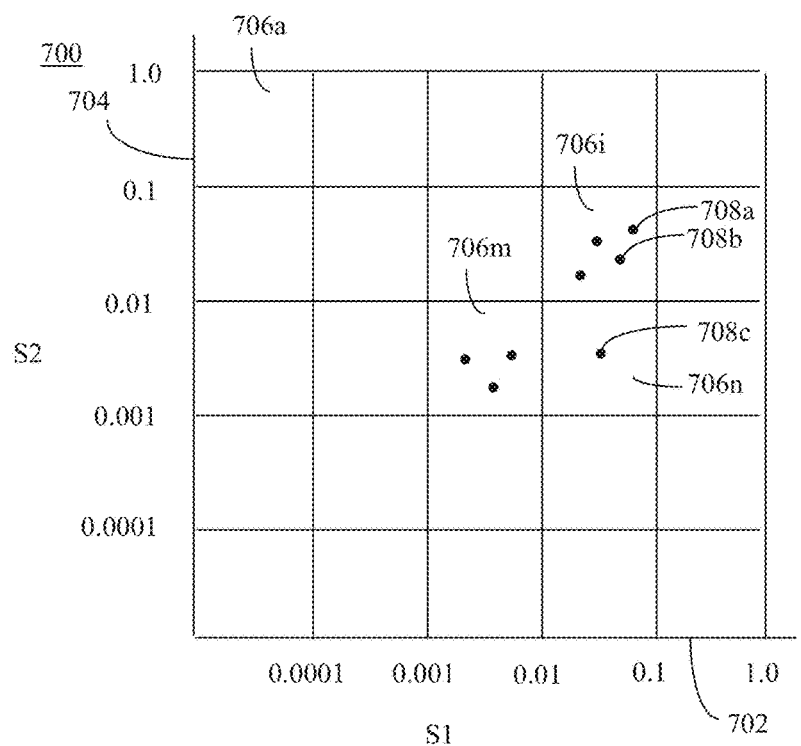
FIG. 7 shows a graphical representation of a selectivity space, according to an example embodiment.

For instance, FIG. 7 shows an example graphical representation of a selectivity space 700, according to an embodiment. Selectivity space 700 is a two-dimensional selectivity space, and thus corresponds to a query template having two efficiency expressions. If selectivity space 700 corresponded to a query template having three or more efficiency expressions, selectivity space 700 would have three or more dimensions corresponding to the number of efficiency expressions. However, selectivity space 700 is provided as a two-dimensional selectivity space for ease of illustration.

As shown in FIG. 7, selectivity space 700 has a first axis 702 labeled as "S1" and a second axis 704 labeled as "S2". "S1" and "S2" are "selectivities" that correspond to a pair of efficiency expressions. For instance, referring to the example query template shown above (SELECT * FROM T WHERE (a=@p1) OR (b<@p2)), "S1" may correspond to the first efficiency expression (a=@p1), and "S2" may correspond to the second efficiency expression (b<@p2).

As shown in FIG. 7, first axis 702 and second axis 702 have logarithmic scales, each starting with zero at the origin and having a maximum of 1.0, with a progression from 0 to 1.0 according to logarithmic factors of 10, of 0.0001, 0.001, 0.01, and 0.1. Thus, a five-by-five grid is formed by selectivity space 700, forming twenty-five selectivity regions 706a-706y (or "selectivity cells"). In other embodiments, a selectivity space may form a grid of a different number of selectivity regions than shown in FIG. 7 (e.g., a 10 by 10 grid, a 7 by 7 grid, a 100 by 100 grid, etc.).

Each selectivity region 706 corresponds to a range of fractions of the total number of rows of the targeted table that satisfy the efficiency expressions associated with the axes. For instance, in FIG. 7, with respect to the example query template shown above (SELECT * FROM T WHERE (a=@p1) OR (b<@p2)), selectivity region 706a at coordinates (0, 4) corresponds to the fractional range of 0-0.0001 of the total number of rows of the targeted table that satisfy (a=@p1) for particular values for the parameter @p1, and the fractional range of 0.1-1.0 of the total number of rows of the targeted table that satisfy (b<@p2) for particular values for the parameter @p2, as determined by dispatcher 208. Selectivity region 706i at coordinate (3, 3) corresponds to the fractional range of 0.01-0.1 of the total number of rows of the targeted table that satisfy (a=@p1) for particular values for the parameter @p1, and the fractional range of 0.01-0.1 of the total number of rows of the targeted table that satisfy (b<@p2) for a particular values for the parameter @p2, as determined by dispatcher 208.

A plurality of query points 708 are shown indicated in selectivity space 700 that each corresponds to a received query (after such queries are received). Each query point 708 corresponds to selectivities determined for the corresponding query—a fraction of the total number of rows qualified by the corresponding efficiency expressions for particular parameter values of the query. For instance, query point 708a is indicated as located in selectivity region 706i. Query point 708a may correspond to a particular received query providing (5, 32) as values for the parameters @p1 and @p2 for the above example query template. In such an example, that particular received query resulted in the fraction of 0.5 of the total number of rows of the targeted table that satisfy (a=5) and resulted in the fraction of 0.4 of the total number of rows of the targeted table that satisfy (b<32).

Query plans have different efficiencies depending on parameter values. A query plan may be assumed to remain efficient for a set of queries as long as the parameter values of the queries lead to respectively similar sizes of intermediate results over single tables. As such, each selectivity region 706 of selectivity space 700 may correspond to a particular query plan. The query plan for a particular selectivity region 706 is assumed to remain sufficiently efficient for a set of queries (graphically represented by the query points 708 located in the selectivity region 706 in FIG. 7) having parameter values such that their selectivities reside therein.

It is noted that dispatcher 208 and associated plan variants 404 may be invalidated when statistics describing data distribution in tables referenced in the respective query template are refreshed. This is because cardinality estimates may be different after the tables are refreshed, if the data is significantly different. In such a case, dispatcher 208 may need to be regenerated.

Referring back to flowchart 300 in FIG. 3, in step 310, the first query is compiled to generate a first query plan. Query plan selector 604 may use the key generated for received query 412 to attempt to look up a query plan for query 412 that is stored in cache 402. Query plan selector 604 may not find a query plan associated with the generated key, and thus may determine that no query plan for query 412 is present. As such, query compiler 206 may transmit a query compile request 414 to query compiler 206 to request that a query plan for received query 412 be generated. Query compiler 206 receives query compile request 414, and compiles received query 412 to generate a query plan for received query 412.

In step 312, a first selectivity region in the selectivity space is determined for the first query. For example, in an embodiment, selectivity region mapper 610 may determine a selectivity region of the selectivity space associated with the first query. As shown in FIG. 4, dispatcher 208 receives received query 412. Selectivity region mapper 610 is configured to map the query plan generated for received query 412 to a selectivity region in the selectivity space defined according to step 308.

Selection of query plans by a query optimizer depends on selectivities of subtrees of an input relational tree for a query. Selectivities Si of a selectivity space may be defined as shown below for Equation 1:

$$Si = CARD(Ei)/CARD(Ti),\qquad \text{Equation 1}$$

where i=a number of selectivities (efficiency expressions) of the received query, Si=a selectivity that corresponds to a efficiency expression of the query, Ei=an efficiency expression of selectivity i, and Ti=a table targeted by the efficiency expression i.

Equation 1 expresses a mapping between regions in the space of these selectivities to plans (e.g., as shown graphically in FIG. 7). Similar selectivities tend to lead to similar query plans, so that a same query plan may be optimal or at least efficient in a given neighborhood. Due to a high cost of query compilation and representation cost, a mapping between query plans and selectivity regions is approximated with certain granularity and may be built lazily. As described above, a grid is defined over the selectivity space, such that the axes of the selectivity regions follow a logarithmic scale, in an embodiment. Each selectivity region may be associated with a query plan. When a query with parameter values (pi, Ti) is submitted for execution, selectivity region mapper 610 may generate selectivities si(pi, Ti) for the query to determine the selectivity region for the query.

Selectivity region mapper 610 may generate an indication of the selectivity region in the form of coordinates in the selectivity space for the selectivity region. For example, in selectivity space 700 of FIG. 7, received query 412 may correspond to point 708a residing in selectivity region 706i. As such, selectivity region mapper 610 may generate an indication of selectivity region 706i as the coordinates (3, 3), for example. In other embodiments, selectivity region mapper 610 may generate an indication of a selectivity region in another form.

Figure 8:
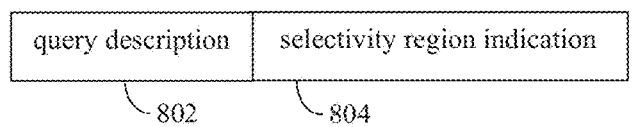
FIG. 8 shows a block diagram of a key, according to an example embodiment.

Referring back to FIG. 3, in step 314, a first key is generated for the first query that includes an indication of the first selectivity region. Key generator 602 of dispatcher 208 may generate a key for received query 412. The generated key is configured to be used to match a query plan with received query 412. Furthermore, the generated key is configured to express an applicability of the matched query plan (e.g., applicability to further queries). In an embodiment, key generator 602 forms a key 800 for each received query as shown in FIG. 8. As shown in FIG. 8, key 800 includes query description 802 and SR indication 804. Query description 802 may be the query template (e.g., in the form of query language text, such as SQL) associated with received query 412, formed by entering placeholders for the parameter values of received query 412. SR indication 804 is an indication of the selectivity region generated by selectivity region mapper 610 for received query 412 in step 312. In alternative embodiments, key 800 may have other configurations.

In step 316, the first query plan is stored in association with the first key. For example, as shown in FIG. 4, dispatcher 208 outputs a key 406, which is the key generated for received query 412 (e.g., in step 314, by key generator 602), and key 406 is stored in cache 402. Query compiler 206 outputs a query plan 410, which is the query plan generated for received query 412 (e.g., in step 310). Query plan 410 is stored in cache 402 (e.g., by query compiler 206 or by dispatcher 208) in association with key 406. The entry of key 406 and query plan 410 in cache 402 may be referred to as a plan variant 404. Any number of plan variants 404 may be stored in cache 402 that each include a corresponding key 406 and query plan 410.

In step 318, the first query plan is executed with respect to the first query. For example, as shown in FIG. 4, dispatcher 208 transmits a query execution request 416, which is received by query execution module 210. Query execution module 210 also receives received query 412. Query execution request 416 may include query plan 410, and is a request for query execution module 210 to execute query plan 410 with respect to received query 412. For example, query execution module 208 may interact with database 114 of FIG. 1 to retrieve data for query response 412 by executing query plan 410 on query 412. As shown in FIG. 4, query execution module 210 transmits query response 112, which may include one or more records and/or other data of database 114. As shown in FIG. 1, query response 112 may be received by query source 106.

B. Example Embodiments for Processing Subsequent Queries

Figure 9:
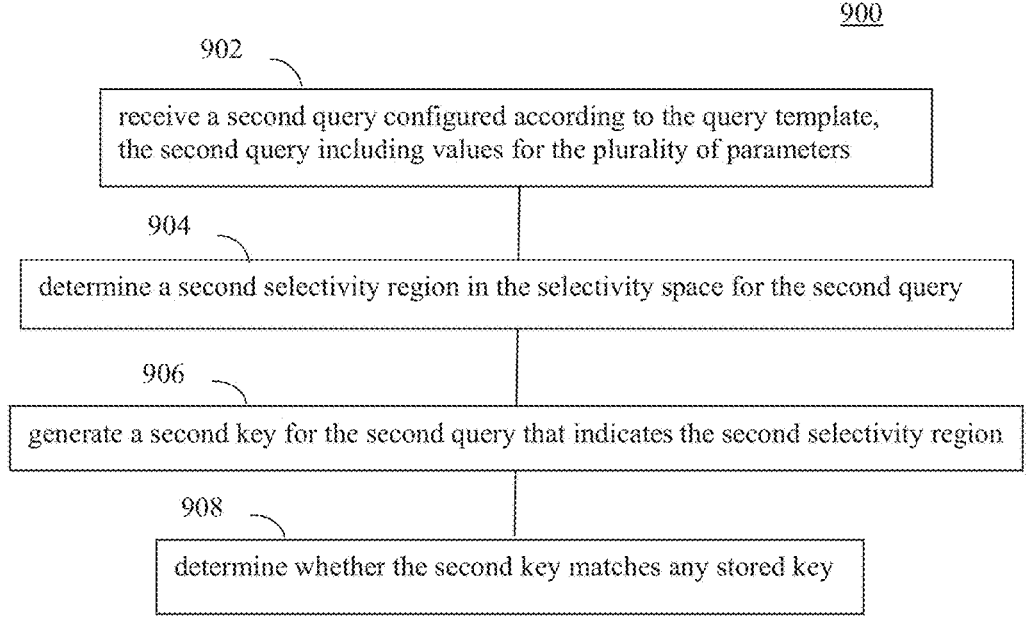
FIG. 9 shows a flowchart for processing subsequently received queries, according to an example embodiment.

Queries that are received by query processing system 108 subsequently to first query 110 may be processed in a similar manner. For instance, FIG. 9 shows a flowchart 900 for processing subsequent queries, according to an example embodiment. For example, in an embodiment, query processing system 108 may operate according to flowchart 900. Further structural and operational embodiments will be apparent to persons skilled in the relevant art(s) based on the discussion regarding flowchart 900. Flowchart 900 is described as follows.

In step 902, a second query configured according to the query template is received, the second query including values for the plurality of parameters. For example, referring to FIG. 4, a second query similar to query 110 may be received by query interface 202. The second query may be the next query received after query 110 or may be any subsequently received query, and may include a second set of values for the plurality of parameters. The second query may be configured according to the same query template as query 110, and thus may be handled by dispatcher 208. Note that in an embodiment, upon receipt of each additional query, dispatcher generator 204 may determine whether a dispatcher is present for the query (similarly to step 304 of flowchart 300 in FIG. 3) prior to proceeding to step 904 of flowchart 900.

In step 904, a second selectivity region in the selectivity space is determined for the second query. For instance, selectivity region mapper 610 of FIG. 6 may map the second query to a selectivity region in the selectivity space (similarly to step 312 described above). Selectivity region mapper 610 may generate an indication of the selectivity region in the form of coordinates in the selectivity space for the selectivity region, or in other form. For example, in selectivity space 700 of FIG. 7, the second query may correspond to point 708*c* residing in selectivity region 706*n*. As such, selectivity region mapper 610 may generate an indication of selectivity region 706*i* as the coordinates (3, 2), for example.

In step 906, a second key is generated for the second query that indicates the second selectivity region. For example, in an embodiment, key generator 602 of FIG. 6 may generate a key for the second query that includes query description 802 of FIG. 8 (e.g., text of the query template) and an indication of the second selectivity region determined in step 904 for the second query.

Figure 10:
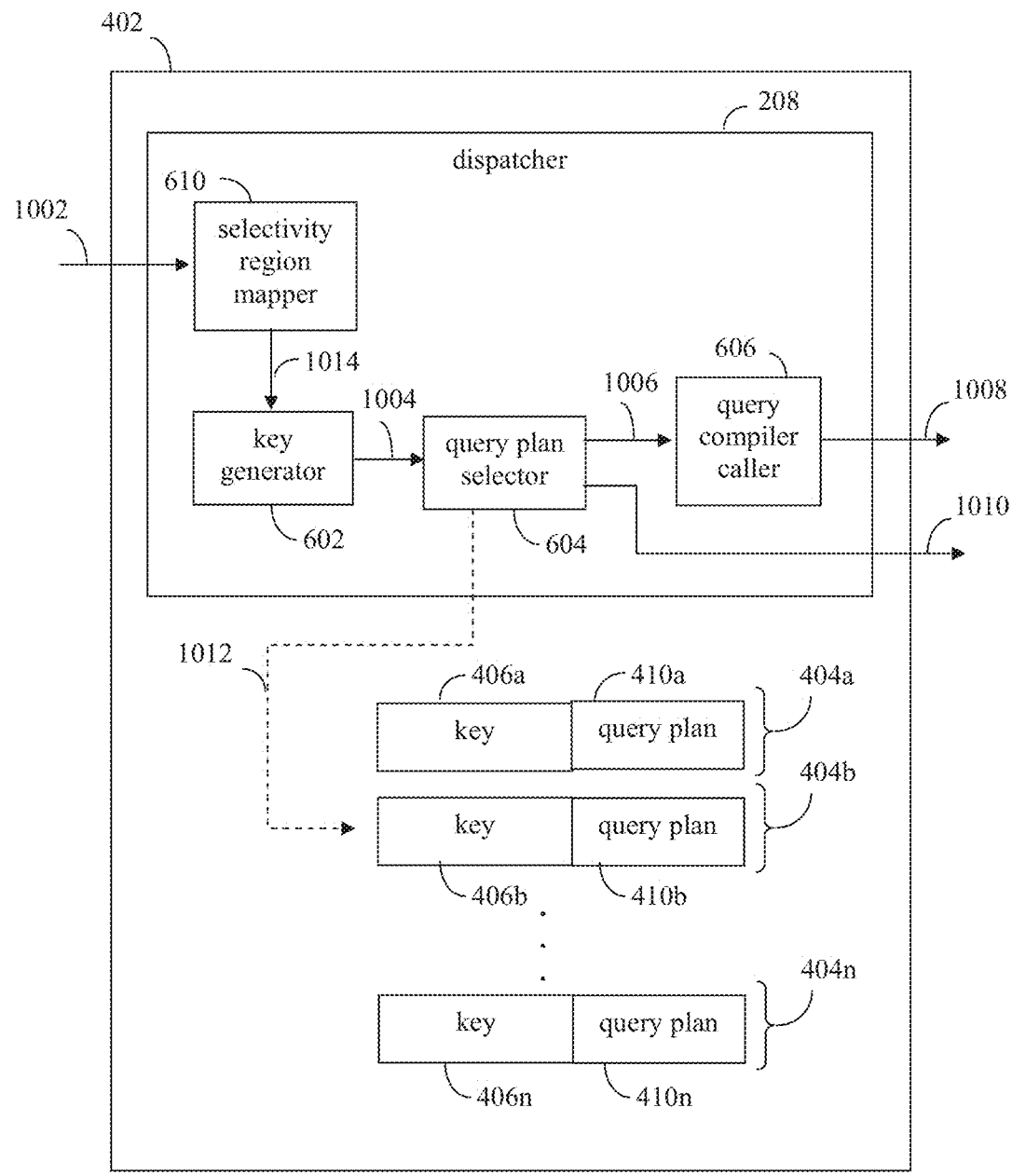
FIG. 10 shows a block diagram of a cache memory, according to an example embodiment.

For instance, FIG. 10 shows a block diagram of cache 402 of FIG. 4, according to an example embodiment. As shown in FIG. 10, cache 402 includes dispatcher 208 of FIG. 6 and a plurality of plan variants 404*a*-404*n*. Plan variants 404*a*-404*n* each include a corresponding one of each of keys 406*a*-406*n* and query plans 410*a*-410*n*. As shown in FIG. 10, selectivity region mapper 610 of dispatcher 208 receives a query 1002, which may be a query received subsequently to query 110. Selectivity region mapper 610 generates a selectivity region indication 1004, which is received by key generator 602. Key generator 602 generates a key 1004 for query 1002, in a manner as described above.

In step 908, whether the second key matches any stored key is determined. For example, as shown in FIG. 10, query plan selector 604 may receive key 1004. Query plan selector 604 may use key 1004 to attempt to look up a query plan for query 1002 that is stored in cache 402, as indicated by dotted line 1012 in FIG. 10.

Figure 11:
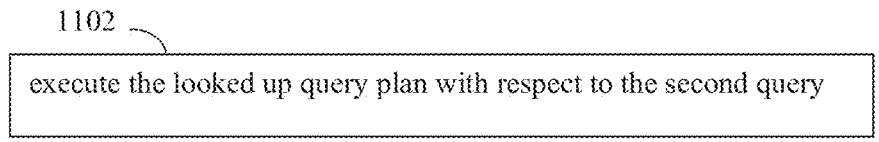
FIG. 11 shows a process for executing a previously existing query plan for a received query, according to an example embodiment.

If query plan selector 604 determines that one of keys 406*a*-406*n* matches key 1004, step 1102 shown in FIG. 11 may be performed. In step 1102, the looked up query plan is executed with respect to the second query. For instance, if key 406*a* in cache 402 matches key 1004, query plan 410*a* may be used to execute query 1002. As such, query plan selector 604 may generate a query execution request 1010, which is received by query execution module 210 (query execution module 210 also receives query 1002). Query execution request 416 includes query plan 410, and is a request for query execution module 210 to execute query plan 410*a* with respect to query 1002.

Figure 12:
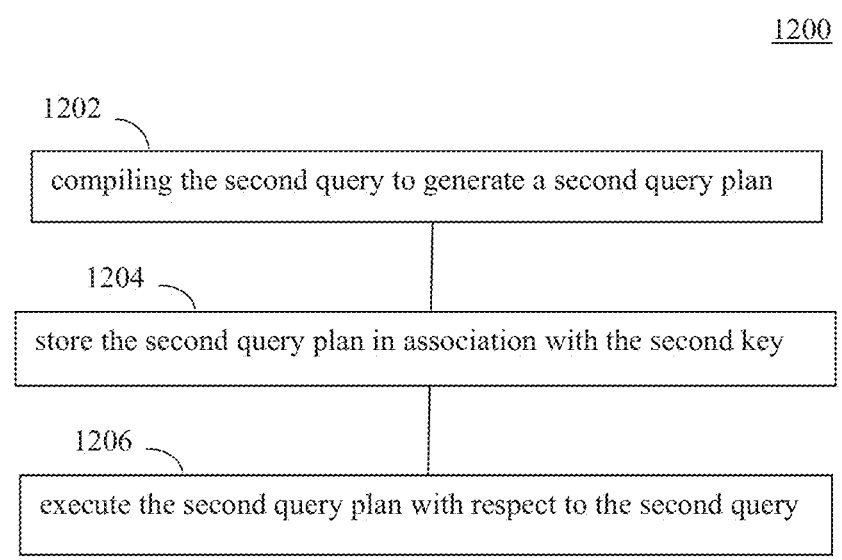
FIG. 12 shows a flowchart for generating and executing a query plan for a received query, according to an example embodiment.

If query plan selector 604 determines that none of keys 406*a*-406*n* matches key 1004, flowchart 1200 shown in FIG. 12 may be performed, which is similar to steps 310, 316, and 318 of flowchart 300 in FIG. 3. In step 1202 of flowchart 1200, the second query is compiled to generate a second query plan. Furthermore, as shown in FIG. 10, query plan selector 604 generates a need query plan indication 1006. Query compiler caller 606 receives need query plan indication 1006, and transmits a query compile request 1008 to query compiler 206 to request that a query plan be generated for query 1002. Query compiler 206 receives query compile request 1008, and compiles query 1002 to generate a query plan for query 1002.

In step 1204, the second query plan is stored in association with the second key. For example, key 1004 generated by key generator 602 and the query plan generated by query compiler 206 for query 1002 may be stored in cache 402 as an additional plan variant 404 (e.g., plan variant 404*o*).

In step 1206, the second query plan is executed with respect to the second query. For example, as described above with respect to FIG. 4, dispatcher 208 may transmit a query execution request that is received by query execution module 210, that is a request for query execution module 210 to execute the query plan generated in step 1202 with respect to query 1002. Query execution module 208 may interact with database 114 of FIG. 1 to retrieve data for a query response by executing the query plan on query 1002. As described above with respect to FIG. 4, query execution module 210 may transmit a query response that may include one or more records and/or other data of database 114.

C. Example Embodiments for Managing Plan Variants

The plan variants generated and used for received queries may be managed in various ways. In some embodiments, plan sharing is performed, while in other embodiments, plans are not shared. For instance, in one embodiment, each plan variant 404 stored in cache 402 may be maintained separately. In other words, regardless of whether two or more query plans 410 stored in cache 402 are identical, in an embodiment, no association is made between the corresponding plan variants 404. In such a case, no plan sharing is performed. In an embodiment where plan sharing is not performed, a key 406 may include an indication of an associated selectivity region (selectivity region indication 804), as described above.

In another embodiment, plan variants 404 stored in cache 402 may be merged together if their corresponding query plans 410 are substantially the same (e.g., the query plans have the same tree structure). In such a case, plan sharing is performed. In an embodiment where plan sharing is performed, a key 406 may not be configured to include selectivity region indication 804. Instead, key 406 may include an identifier (e.g., a number) for a query plan signature, and dispatcher 208 may include a mapping between selectivity regions and plan signatures. This way a single query plan may be associated with one or more selectivity regions.

Figure 13:
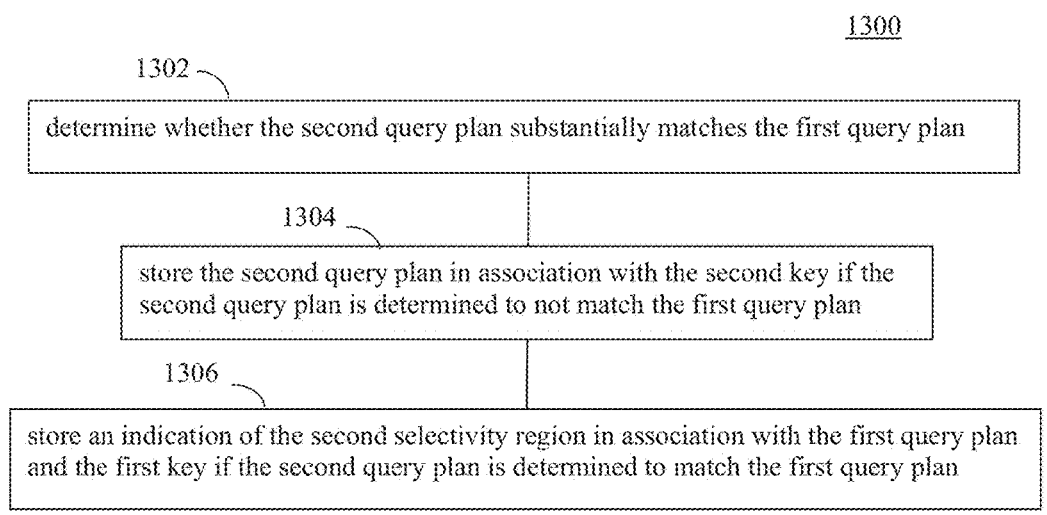
FIG. 13 shows a flowchart for managing selectivity regions, according to an example embodiment.

FIG. 13 shows a flowchart for managing selectivity regions using plan sharing, according to an example embodiment. Further structural and operational embodiments will be apparent to persons skilled in the relevant art(s) based on the discussion regarding flowchart 1300. Flowchart 1300 is described as follows.

In step 1302, whether the second query plan substantially matches the first query plan is determined. For example, dispatcher 208 may compare a query plan generated by query compiler 206 (e.g., in step 1202 of FIG. 12) to the first query plan (e.g., generated in step 310 of FIG. 3) and any other query plans (e.g., query plans 410*a*-410*n*) stored in cache 402 to determine whether the generated query plan matches any of them. Query plans may match if they are substantially the same. For example, a query plan has a particular operator tree structure, as would be known to persons skilled in the relevant art(s). In an embodiment, a query plan structure may be expressed by a number referred to as a plan signature. Whether a pair of query plans substantially match may be determined by comparing plan signatures of the query plans (i.e., comparing the numbers that represent the plan signatures).

In step 1304, the second query plan is stored in association with the second key if the second query plan is determined to not match the first query plan. For example, if the generated query plan is determined to not substantially match any query plan stored in cache 402, the key for the query plan and the query plan may be stored as a separate plan variant 404 in cache 402 (e.g., as described above in step 1204).

In step 1306, an indication of the second selectivity region is stored in association with the first query plan and the first key if the second query plan is determined to match the first query plan. For example, in an embodiment, if the generated query plan is determined to substantially match a query plan stored in cache 402, rather than performing step 1206, the indication of the selectivity region determined for the query plan may be stored in the plan variant of the matching query plan in cache 402. For example, if the generated query plan is determined to substantially match first query plan 410*a* (e.g., having SR indication 408*a* of (3, 3)), and the selectivity region for the generated query plan was determined to be (3, 2), the SR indication of (3, 2) may be included with the existing SR indication 408*a* of plan variant 404*a*. As such, SR indication 408*a* of plan variant 404*a* may be (3, 2), (3, 3). In such an embodiment, no separate plan variant 404 need be added to cache 402 by dispatcher 208 for the generated query plan.

III. Further Example Embodiments

It is noted that in the example embodiments described above, parameters are typically referenced as regular parameters (e.g., single values). In embodiments, the parameters described above may alternatively be table-valued parameters. For instance, in addition to scalar parameters that are placeholders for simple types (e.g., numbers, strings), table-valued parameter (TVPs) may be used, where a TVP refers to a table. The table used for a TVP is provided at runtime. For instance, an example query template is shown below:

SELECT name from @STUDENTS where @STUDENTS.grade='A', where values of @STUDENTS are different tables. This type of query can be processed by the same techniques described herein for scalar parameters. In the above example, @STUDENTS.grade='A' is an efficiency expression. Selectivity region mapper 610 may be configured to compute cardinality for this efficiency expression. At runtime, for regular parameters, parameter values are used to evaluate efficiency expressions. In the case of TVPs, as in the present example, statistics describing data distribution in the provided table are used.

In embodiments, new plan variants and mappings to efficiency regions are determined as subsequent queries are received and processed. However, for equality predicates, such as a=@p, it is possible to predetermine plan variants before receiving actual queries from a workload (e.g., prior to runtime). Query plans may be generated for characteristic values based on the data distribution of a column represented by column statistics, such as a histogram. For example, in an embodiment, a plan variant may be pre-generated for a frequent value of "a", such as "USA." Furthermore, a plan variant may be pre-generated for an infrequent value of "a", such as "FIJI."

In an embodiment, selectivity region mapper 610 may use the same cardinality estimation logic as query compiler 206 to map a query to a selectivity region. As such, the values obtained during mapping and query compilation are consistent. In addition, selectivity region mapper 610 may be configured to handle general predicates.

In an embodiment, it may be desirable for query processing system 108 to be independent of an order of incoming queries (e.g., the efficiency region mapping and plan variant generation may be performed for a given set of queries regardless of their received order). In such an embodiment, a query may not be compiled for supplied parameter values to obtain a plan variant for a given selectivity region, and instead, a same point in the selectivity region, (e.g., upper right corner) may be selected, and the query may be compiled, to force selectivities associated with that point on respective efficiency expressions. As such, query compiler 206 may be configured to generate query plans under selectivity constraints on query subexpressions.

In an embodiment, selectivity region mapper 610 may be configured to evaluate efficiency expressions before running any query. In such an embodiment, cardinality estimation logic may be executed that is costly, especially, when the query itself runs fast. As such, simple per dimension caches stored in the dispatcher may be used. Each cache may map parameter values involved in the efficiency expression associated with a given dimension to a relevant cardinality estimate. It is noted that users may tend to frequently reuse the same parameter values, and in such cases, the cache may allow the cardinality estimation logic to be bypassed, and for the correct estimate to be immediately output.

IV. Additional Embodiments

In an embodiment, a method comprises: receiving a first query configured according to a query template, the first query including values for a plurality of parameters of the query template; determining that a dispatcher is not present for the first query; generating a dispatcher for the query template in response to said determining that a dispatcher is not present for the first query; defining a selectivity space as an array of selectivity regions arranged according to a logarithmic-scale grid that has a number of dimensions equal to a number of efficiency expressions of the first query; compiling the first query to generate a first query plan; determining a first selectivity region in the selectivity space for the first query using the dispatcher; generating a first key for the first query that includes an indication of the first selectivity region; storing the first query plan in association with the first key; and executing the first query plan with respect to the first query.

In an embodiment, the method further comprises: determining a plan variant for an equality efficiency expression of the query template prior to receiving the first query, the plan variant including a corresponding key and query plan; and storing the plan variant.

In an embodiment, the method further comprises: evaluating the efficiency expressions prior to receiving the first query, including mapping parameter values of an efficiency expression associated with a given dimension to a relevant cardinality estimate.

In an embodiment, the method further comprises: receiving a second query configured according to the query template, the second query including values for the plurality of parameters; determining a second selectivity region in the selectivity space for the second query using the dispatcher; generating a second key for the second query that includes the second selectivity region; determining whether the second key matches any stored key including the first key; and executing the first query plan with respect to the second query if the second key is determined to match the first key.

In an embodiment, the method further comprises: if the second key is determined to not match any stored key, compiling the second query to generate a second query plan, and executing the second query plan with respect to the second query.

In an embodiment, the method further comprises: storing the second query plan in association with the second key if the second key is determined to not match any stored key.

In an embodiment, the method further comprises: determining whether the second query plan substantially matches the first query plan; storing the second query plan in association with the second key if the second query plan is determined to not match the first query plan; and storing an indication of the second selectivity region in association with the first query plan and the first key if the second query plan is determined to match the first query plan.

In an embodiment, at least one parameter of the plurality of parameters is a table valued parameter.

In another embodiment, a system, comprises: a query interface configured to receive queries configured according to a query template, the query interface receiving a first query that includes values for a plurality of parameters of the query template; a dispatcher generator configured to generate a dispatcher if the dispatcher is determined to not be present for the query template, the dispatcher including a query compiler caller, a key generator, and a selectivity region mapper; and a cache that stores the dispatcher; the selectivity region mapper being configured to map the first query to a first selectivity region in a selectivity space, the selectivity space having a number of dimensions equal to a number of efficiency expressions of the first query, the selectivity space including an array of selectivity regions arranged according to a regular grid; the key generator being configured to generate a first key for the first query that includes an indication of the first selectivity region; the query compiler caller being configured to request the first query to be compiled to generate a first query plan; the first query plan being stored in the cache in association with the first key; and the first query plan being executed with respect to the first query.

In an embodiment, the key generator is configured to form the first key to include the query template and the indication of the first selectivity region.

In an embodiment, the dispatcher further comprises: a query plan selector that is configured to lookup query plans stored in the cache for received queries; the query interface receiving a second query configured according to the query template; the selectivity region mapper being configured to map the second query to a second selectivity region in the selectivity space; the key generator being configured to generate a second key for the second query that includes an indication of the second selectivity region; and the query plan selector being configured to determine whether the second key matches any key stored in the cache, and if a matched key is determined, to select a query plan corresponding to the matched key for execution with respect to the second query.

In an embodiment, if the query plan selector determines that the second key does not match any key stored in the cache, the query compiler caller is configured to request the second query to be compiled to generate a second query plan, and the second query plan is executed with respect to the second query.

In an embodiment, the second query plan is stored in the cache in association with the second key.

In an embodiment, the second query plan is stored in the cache in association with the second key if the dispatcher determines that the second query plan does not match the first query plan; and wherein an indication of the second selectivity region is stored in association with the first query plan and the first key if the dispatcher determines that the second query plan matches the first query plan.

In an embodiment, a cardinality estimation logic used by the selectivity region mapper to determine the selectivity region is the same as a cardinality estimation logic used by the query compiler to compile the query.

In another embodiment, a method, comprises: receiving a query configured according to a query template, the query including values for a plurality of parameters; determining a selectivity region for the query in a selectivity space, the selectivity space having a number of dimensions equal to a number of efficiency expressions of the first query and including an array of selectivity regions arranged according to a regular grid; generating a key for the query that includes the selectivity region; determining whether the generated key matches any key of a plurality of keys associated with previously received queries; and if the generated key is determined to not match any key of the plurality of keys, compiling the query to generate a query plan, and executing the generated query plan with respect to the query.

In an embodiment, the generating a key for the query comprises: forming the key to include the query template and the indication of the selectivity region.

In an embodiment, the method further comprises: if the generated key is determined to match any key of the plurality of keys, selecting a query plan associated with the matched key, and executing the query plan associated with the matched key with respect to the query.

In an embodiment, if the generated key is determined to not match any key of the plurality of keys, storing the generated query plan in association with the generated key.

In an embodiment, the compiling comprises: selecting a predetermined point in the selectivity region; and compiling the query to force selectivities associated with the selected point on respective efficiency expressions to generate the query plan.

V. Example Computing Device Embodiments

Query processing system 108, query interface 202, dispatcher generator 204, query compiler 206, dispatcher 208, query execution module 210, key generator 602, query plan selector 604, query compiler caller 606, and selectivity region mapper 610 may be implemented in hardware, software, firmware, or any combination thereof. For example, query processing system 108, query interface 202, dispatcher generator 204, query compiler 206, dispatcher 208, query execution module 210, key generator 602, query plan selector 604, query compiler caller 606, and/or selectivity region mapper 610 may be implemented as computer program code configured to be executed in one or more processors. Alternatively, query processing system 108, query interface 202, dispatcher generator 204, query compiler 206, dispatcher 208, query execution module 210, key generator 602, query plan selector 604, query compiler caller 606, and/or selectivity region mapper 610 may be implemented as hardware logic/electrical circuitry.

FIG. 16 depicts an exemplary implementation of a computer 1600 in which embodiments of the present invention may be implemented. For example, computer system 102 and/or server 104 may each be implemented similarly to computer 1600, including one or more features of computer 1600 and/or alternative features. Computer 1600 may be a general-purpose computing device in the form of a conventional personal computer, a mobile computer, or a workstation, for example, or computer 1600 may be a special purpose computing device. The description of computer 1600 provided herein is provided for purposes of illustration, and is not intended to be limiting. Embodiments of the present invention may be implemented in further types of computer systems, as would be known to persons skilled in the relevant art(s).

Figure 14:
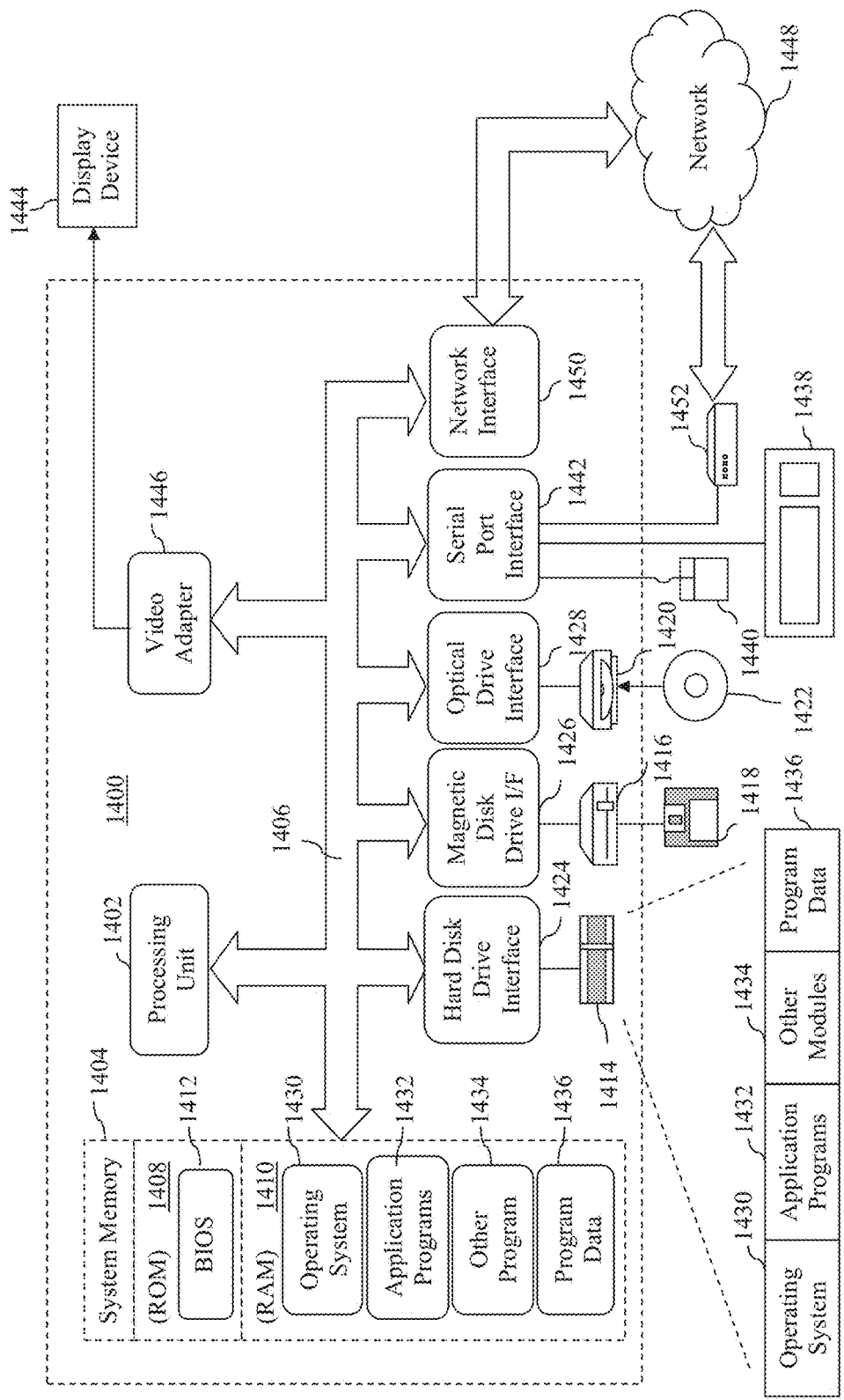
FIG. 14 shows a block diagram of an example computer that may be used to implement embodiments of the present invention.

As shown in FIG. 14, computer 1400 includes a processing unit 1402, a system memory 1404, and a bus 1406 that couples various system components including system memory 1404 to processing unit 1402. Bus 1406 represents one or more of any of several types of bus structures, including a memory bus or memory controller, a peripheral bus, an accelerated graphics port, and a processor or local bus using any of a variety of bus architectures. System memory 1404 includes read only memory (ROM) 1408 and random access memory (RAM) 1410. A basic input/output system 1412 (BIOS) is stored in ROM 1408.

Computer 1400 also has one or more of the following drives: a hard disk drive 1414 for reading from and writing to a hard disk, a magnetic disk drive 1416 for reading from or writing to a removable magnetic disk 1418, and an optical disk drive 1420 for reading from or writing to a removable optical disk 1422 such as a CD ROM, DVD ROM, or other optical media. Hard disk drive 1414, magnetic disk drive 1416, and optical disk drive 1420 are connected to bus 1406 by a hard disk drive interface 1424, a magnetic disk drive interface 1426, and an optical drive interface 1428, respectively. The drives and their associated computer-readable media provide nonvolatile storage of computer-readable instructions, data structures, program modules and other data for the computer. Although a hard disk, a removable magnetic disk and a removable optical disk are described, other types of computer-readable media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 1430, one or more application programs 1432, other program modules 1434, and program data 1436. Application programs 1432 or program modules 1434 may include, for example, computer program logic for implementing query processing system 108, query interface 202, dispatcher generator 204, query compiler 206, dispatcher 208, query execution module 210, key generator 602, query plan selector 604, query compiler caller 606, selectivity region mapper 610, flowchart 300, flowchart 900, step 1102, flowchart 1200 and/or flowchart 1300 (including any step of flowcharts 300, 900, 1200, and 1300).

A user may enter commands and information into the computer 1400 through input devices such as keyboard 1438 and pointing device 1440. Other input devices (not shown) may include a microphone, joystick, game pad, satellite dish, scanner, or the like. These and other input devices are often connected to the processing unit 1402 through a serial port interface 1442 that is coupled to bus 1406, but may be connected by other interfaces, such as a parallel port, game port, or a universal serial bus (USB).

A display device 1444 is also connected to bus 1406 via an interface, such as a video adapter 1446. In addition to the monitor, computer 1400 may include other peripheral output devices (not shown) such as speakers and printers.

Computer 1400 is connected to a network 1448 (e.g., the Internet) through an adaptor or network interface 1450, a modem 1452, or other means for establishing communications over the network. Modem 1452, which may be internal or external, is connected to bus 1406 via serial port interface 1442.

As used herein, the terms "computer program medium" and "computer-readable medium" are used to generally refer to media such as the hard disk associated with hard disk drive 1414, removable magnetic disk 1418, removable optical disk 1422, as well as other media such as flash memory cards, digital video disks, random access memories (RAMs), read only memories (ROM), and the like.

As noted above, computer programs and modules (including application programs 1432 and other program modules 1434) may be stored on the hard disk, magnetic disk, optical disk, ROM, or RAM. Such computer programs may also be received via network interface 1450 or serial port interface 1442. Such computer programs, when executed or loaded by an application, enable computer 1400 to implement features of embodiments of the present invention discussed herein. Accordingly, such computer programs represent controllers of the computer 1400.

The invention is also directed to computer program products comprising software stored on any computer useable medium. Such software, when executed in one or more data processing devices, causes a data processing device(s) to operate as described herein. Embodiments of the present invention employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMs, nanotechnology-based storage devices, and the like.

VI. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method in a data processing system that includes storage that stores data, and includes one or more processors configured to execute queries against the data, the method comprising:
   storing a plurality of keys associated with a plurality of previous queries, the plurality of keys including a first key associated with a first previous query;
   receiving a query comprising a plural number of efficiency expressions;
   generating, based on the received query, a second key indicating a first selectivity region in a selectivity space comprising an array of selectivity regions arranged according to a grid with a number of dimensions equal to the plural number;
   comparing the second key to the plurality of keys;
   executing, based on the received query, a stored query plan associated with the first key on a condition that the first key is determined to match the second key; and
   executing, for the received query, a new query plan associated with the second key when the second key is determined to not match any stored key of the plurality of stored keys.

2. The method of claim 1, wherein said executing comprises:
   compiling the received query to generate the new query plan when the second key is determined to not match any stored key of the plurality of stored keys.

3. The method of claim 2, wherein, for subsequent queries, the second key becomes a stored key in the plurality of stored keys and the new query plan becomes a stored query plan among a plurality of stored query plans.

4. The method of claim 1, wherein a stored key indicates a selectivity region.

5. The method of claim 1, wherein a stored key indicates an identifier for a query plan.

6. The method of claim 1, further comprising:
implementing plan sharing so that a first query plan can be associated with one and more than one selectivity regions in the selectivity space.

7. The method of claim 1, wherein generating the second key comprises generating the second key based on parameter values in the plurality of efficiency expressions in the received query.

8. A system, comprising:
one or more processors configured to execute queries for stored data in accordance with:
storage that stores a plurality of keys associated with a plurality of previous queries, the plurality of keys including a first key associated with a first previous query;
a query interface configured to receive a query comprising a plurality of efficiency expressions;
a key generator configured to generate a second key based on the received query, the second key indicating a first selectivity region in a selectivity space comprising an array of selectivity regions arranged according to a grid with a number of dimensions equal to a number of the plurality of efficiency expressions in the query;
a query plan selector configured to compare the second key to the plurality of stored keys; and
a query execution module configured to execute, based on the received query, a stored query plan associated with the first key on a condition that the first key is determined to match the second key;
the query execution module configured to execute, for the received query, a new query plan for the second key when the second key is determined to not match any stored key among the plurality of stored keys.

9. The device of claim 8, further comprising:
a query compiler configured to compile the received query to generate the new query plan when the second key is determined to not match any stored key of the plurality of stored keys.

10. The device of claim 9, wherein, for subsequent queries, the second key becomes a stored key in the plurality of stored keys and the new query plan becomes a stored query plan among a plurality of stored query plans.

11. The device of claim 8, wherein a stored key indicates a selectivity region.

12. The device of claim 8, wherein a stored key indicates an identifier for a query plan.

13. The device of claim 8, wherein plan sharing is implemented so that a first query plan can be associated with one and more than one selectivity regions in the selectivity space.

14. The device of claim 8, wherein the key generator generates the second key based on parameter values in the plurality of efficiency expressions in the received query.

15. A computer storage medium embedded with computer instructions executed by at least one processor to perform steps comprising:
storing a plurality of keys associated with a plurality of previous queries, the plurality of keys including a first key associated with a first previous query;
generating, based on receiving a query comprising a plural number of efficiency expressions, a second key indicating a first selectivity region in multi-dimensional selectivity space comprising an array of selectivity regions arranged according to a grid with a number of dimensions equal to the plural number;
using the second key to look up a stored query plan among a plurality of stored query plans;
executing, based on the received query, a stored query plan associated with the first key on condition that the first key is determined to match the second key; and
executing, for the received query, a new query plan associated with the second key when the second key is determined to not match any stored key of the plurality of stored keys.

16. The computer storage medium of claim 15, wherein said executing comprises:
compiling the received query to generate the new query plan when the second key is determined to not match any stored key of the plurality of stored keys.

17. The method of claim 16, wherein, for subsequent queries, the second key becomes a stored key in the plurality of stored keys and the new query plan becomes a stored query plan among a plurality of stored query plans.

18. The method of claim 16, wherein a stored key indicates a selectivity region or an identifier for a query plan.

19. The method of claim 16, wherein generating the second key comprises generating the second key based on parameter values in the plurality of efficiency expressions in the received query.

20. The method of claim 15, further comprising:
implementing plan sharing so that a first query plan can be associated with one and more than one selectivity regions in the selectivity space.

\* \* \* \* \*